United States Patent [19]
Esterowitz et al.

[11] Patent Number: 5,388,112
[45] Date of Patent: Feb. 7, 1995

[54] DIODE-PUMPED, CONTINUOUSLY TUNABLE, 2.3 MICRON CW LASER

[75] Inventors: Leon Esterowitz, Springfield; Robert C. Stoneman, Alexandria, both of Va.; Joseph F. Pinto, Laurel, Md.

[73] Assignee: The United States of America as represented by the Secretary of the Navy, Washington, D.C.

[21] Appl. No.: 235,844

[22] Filed: Apr. 29, 1994

[51] Int. Cl.⁶ .............................................. H01S 3/10
[52] U.S. Cl. ...................... 372/20; 372/108; 372/93; 372/71; 372/41; 372/105; 372/100; 372/102; 372/99; 372/75
[58] Field of Search .............. 372/80, 41, 99, 100, 372/102, 105, 93, 71, 75, 108

[56] References Cited
U.S. PATENT DOCUMENTS

| | | | |
|---|---|---|---|
| 4,969,150 | 11/1990 | Esterowitz et al. | 372/20 |
| 5,276,695 | 1/1994 | Scheps | 372/20 |
| 5,299,210 | 3/1994 | Snitzer et al. | 372/41 |

Primary Examiner—Léon Scott, Jr.
Attorney, Agent, or Firm—Thomas E. McDonnell; George Jameson

[57] ABSTRACT

A room-temperature solid state laser for producing an output laser emission at any wavelength within a preselected range of wavelengths is disclosed. In a preferred embodiment, the laser comprises: a pump laser for emitting a CW pump beam at a preselected wavelength; a laser cavity defined by a first reflective element, an output coupler reflective element and a folded mirror disposed between the first reflective element and the output coupler reflective element to form a reflective path thereamong in the laser cavity; a laser crystal disposed in the laser cavity, the laser crystal being responsive to the CW pump beam at the preselected wavelength for producing a CW laser emission within a preselected range of wavelengths when the laser crystal is pumped by the CW pump beam at the preselected wavelength, the folded mirror operating to collimate the CW laser emission in the optical path between the folded mirror and the output coupler reflective element; and a tuning element disposed in the laser cavity between the folded mirror and the output coupler reflective element for tuning the collimated CW laser emission to any wavelength within the preselected range of wavelengths.

20 Claims, 3 Drawing Sheets

5,388,112

DIODE-PUMPED, CONTINUOUSLY TUNABLE, 2.3 MICRON CW LASER

BACKGROUND OF THE INVENTION

1. Field of the Invention

The present invention relates to lasers and particularly to a diode-pumped, Tm-doped, CW, solid state laser that is continuously tunable between about 2.20 microns and about 2.46 microns.

2. Description of the Related Art

Interest in the development of tunable solid state lasers has increased significantly in recent years. For example, development of room temperature solid state lasers in the two-micron spectral range has received much attention recently because of potential applications in medicine and optical communications. An exemplary, room temperature, tunable solid state laser that operates in the two-micron range is taught in U.S. Pat. No. 4,969,150 (Esterowitz et al.). U.S. Pat. No. 4,969,150 is directed to an end-pumped, $Tm^{3+}$ ion-doped, solid state laser for producing a CW laser emission continuously tunable over the approximate spectral range of 1.86 to 2.14 microns.

The $Tm^{3+}$ ion-doped in a solid state medium or host exhibits a high multiplicity of Stark level splittings due to the interaction of its partially shielded 4f electrons with the local crystal field The combination of closely spaced $Tm^{3+}$ energy levels, coupled with significant phonon broadening in the lattice, allows for the broad tunability of this rare earth ion in a variety of hosts. The $^3F_4$–$^3H_6$ $Tm^{3+}$ transition, for example, has been continuously tuned from 1.85 microns to 2.15 microns in YAG (yttrium aluminum garnet) and YSGG (yttrium scandium gallium garnet).

Laser action at 2.3 microns based on the $^3H_4$–$^3H_5$ $Tm^{3+}$ transition has been demonstrated in several garnet and fluoride hosts. The development of efficient, diode-pumped, tunable laser sources operating in this wavelength region of from about 2.20 microns to about 2.46 microns is of interest for chemical detection and remote sensing applications. Unfortunately, previous laser operation of the 2.3 micron laser has been either at a single wavelength or at several wavelengths that were not continuously tunable. A major reason for this is that laser performance of the $Tm^{3+}$, $^3H_4$–$^3H_5$, 2.3 micron transition is affected by multiphonon decay and $Tm^{3+}$ ion-pair cross-relaxation. Each of these mechanisms nonradiatively depletes the $^3H_4$ laser level, resulting in reduced fluorescence lifetimes and correspondingly high CW lasing thresholds.

Thus, at the present time, there is a need for a tunable solid state laser that can produce a CW laser emission that is continuously tunable over the approximate spectral range of from 2.20 microns to 2.46 microns for various chemical detection and remote sensing applications.

SUMMARY OF THE INVENTION

Accordingly, one object of the invention is to provide a tunable CW solid state laser which can operate over a preselected wavelength range.

Another object of the invention is to provide a tunable solid state laser which provides a tunable collimated output laser emission.

Another object of the invention is to provide a continuously tunable CW solid state laser in which part of the laser cavity is collimated to allow the use of a tuning element in the collimated part of the laser cavity to determine the output wavelength to be selected from a preselected wavelength range.

A further object of the invention is to provide a continuously tunable CW solid state laser which can be tuned over the wavelength range from about 2.20 microns to about 2.46 microns.

These and other objects of the invention are achieved by providing a room-temperature, solid state, diode-pumped, continuously-tunable, 2.3 micron CW laser for producing an output laser emission at any wavelength within a preselected range of wavelengths from about 2.20 microns to about 2.46 microns. In a preferred embodiment, the laser comprises: a diode pump laser for emitting a CW pump beam at a preselected wavelength; a laser cavity defined by a first reflective element, an output coupler reflective element and a folded mirror disposed between the first reflective element and the output coupler reflective element to form a reflective path thereamong in the laser cavity. A laser crystal is disposed in the laser cavity. The laser crystal is responsive to the CW pump beam at the preselected wavelength for producing a CW laser emission within a preselected range of wavelengths when the laser crystal is pumped by the CW pump beam at the preselected wavelength. The folded mirror operates to establish a tightly focussed beam waist in the laser crystal and also serves to collimate the CW laser emission in the optical path between the folded mirror and the output coupler reflective element. A tuning element is disposed in the laser cavity between the folded mirror and the output coupler reflective element for tuning the collimated CW laser emission to any wavelength within the preselected range of wavelengths between 2.20 microns and 2.46 microns.

BRIEF DESCRIPTION OF THE DRAWINGS

These and other objects, features and advantages of the invention, as well as the invention itself, will become better understood by reference to the following detailed description when considered in connection with the accompanying drawings wherein like reference numerals designate identical or corresponding parts throughout the several views and wherein.

DETAILED DESCRIPTION OF THE PREFERRED EMBODIMENT

Figure 1:
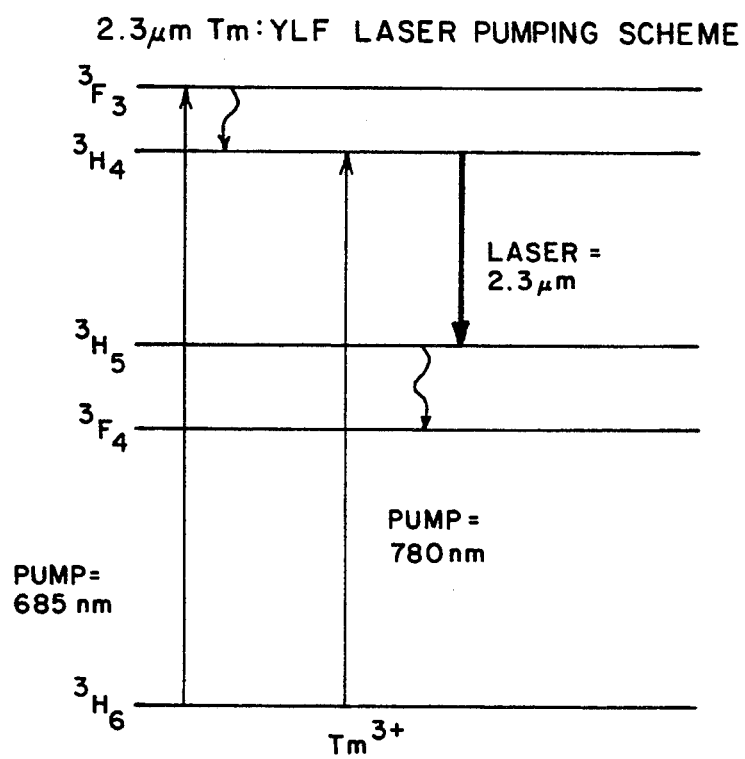
FIG. 1 illustrates the resonant pumping diagram for the $Tm^{3+}$ 2.3 micron laser operation.

Referring now to the drawings, FIG. 1 illustrates the pumping diagram for the 2.3 micron (μm) $Tm^{3+}$:YLF laser. The thulium trivalent dopant ($Tm^{3+}$) in the $Tm^{3+}$:YLF laser is pumped at 780 nanometers (nm)

from the $^3H_6$ ground state directly into the $^3H_4$ manifold. Following the absorption of a pump photon at 780 nm directly into the $^3H_4$ manifold, laser action at 2.3 microns takes place from the $^3H_4$ manifold or upper laser level to the $^3H_5$ manifold or lower laser level. The lower laser level is rapidly depopulated by multiphonon processes to the $^3F_4$ manifold.

Note that the pumping diagram for the 2.3 micron $Tm^{3+}$:YLF laser of FIG. 1 also shows that a 685 nm pump beam could also be utilized to cause the $Tm^{3+}$:YLF laser to emit a laser output at 2.3 microns. In this case the $Tm^{3+}$:YLF laser is pumped at 685 nm from the $^3H_6$ ground state into the $^3F_3$ manifold. Nonradiative decay from the $^3F_3$ manifold into the $^3H_4$ upper laser level follows. Laser action at 2.3 microns then takes place from the $^3H_4$ upper laser level to the $^3H_5$ lower laser level, as discussed before.

Figure 2:
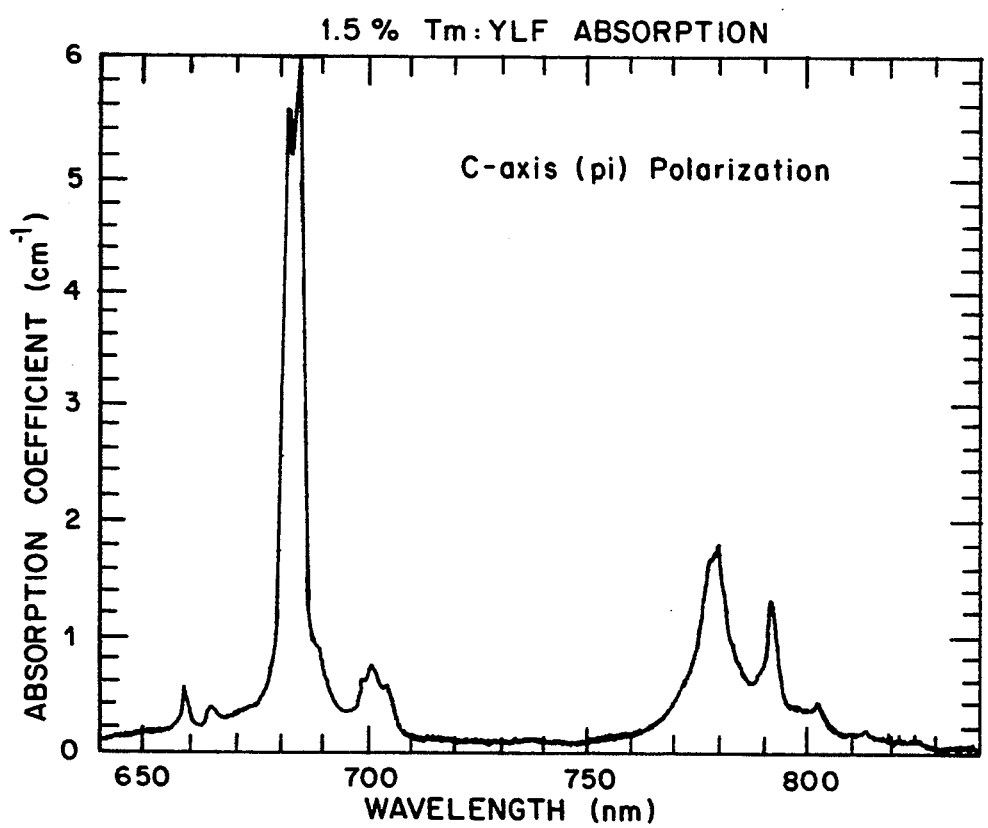
FIG. 2 illustrates the 1.5% $Tm^{3+}$:YLF (thulium:yttrium lithium fluoride) absorption coefficients for pump wavelengths at 685 nm and at 780 nm.

FIG. 2 illustrates the 1.5% $Tm^{3+}$:YLF absorption coefficients for pump wavelengths at 685 nm and at 780 nm. FIG. 2 shows that the absorption coefficient in a 1.5% $Tm^{3+}$:YLF laser is about 1.8 at a pump wavelength of about 780 nm and 6.0 at a pump wavelength of about 685 nm. Thus, in a 1.5% $Tm^{3+}$:YLF laser, the absorption coefficient at a pump wavelength of about 685 nm is about three times stronger than the absorption coefficient at a pump wavelength of about 780 nm. It is therefore clear that it is better to pump the 1.5% $Tm^{3+}$:YLF laser with a 685 nm pump wavelength than with a 780 nm pump wavelength.

Figure 3:
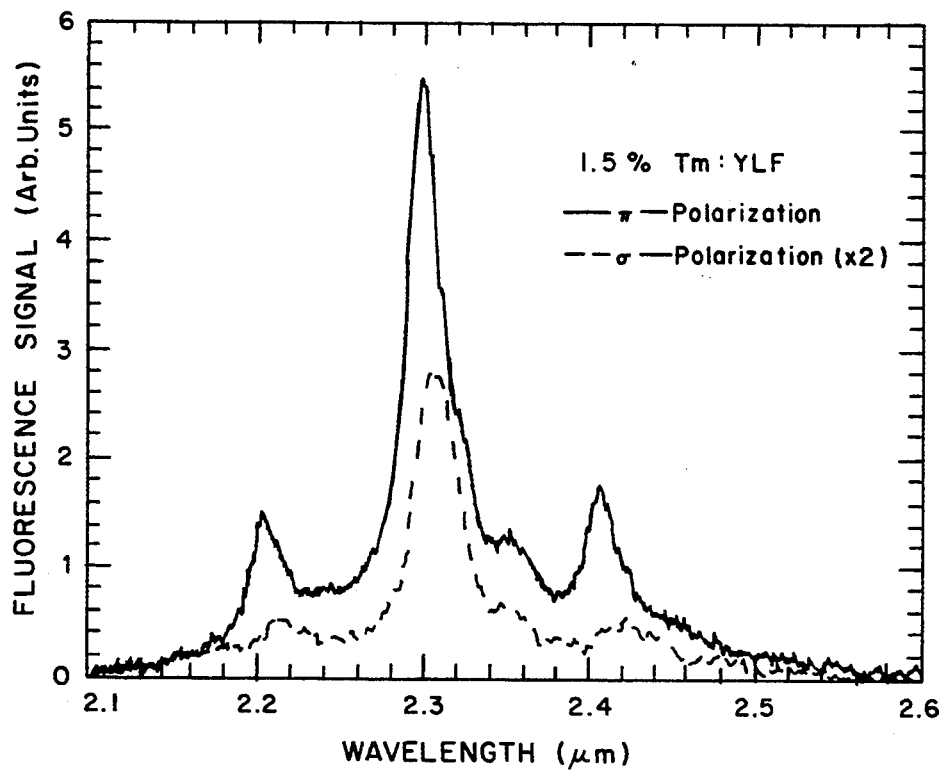
FIG. 3 illustrates the room temperature, polarized fluorescence spectra corresponding to the $^3H_4$–$^3H_5$ transition in $Tm^{3+}$:YLF.

FIG. 3 illustrates the room temperature, polarized fluorescence spectra corresponding to the $^3H_4$–$^3H_5$ transition in a 1.5% $Tm^{3+}$:YLF crystal. Emission corresponding to the $^3H_4$–$^3H_5$ transition is strongly polarized along the c-axis of the crystal ($\pi$-polarized, E || c-axis); the a-axis fluorescence ($\sigma$-polarized, E || a-axis) is four times weaker than the c- axis fluorescence. The broad fluorescence spectrum extending from 2.15 $\mu$m (microns) to 2.5 $\mu$m (microns) is a consequence of the high multiplicity of crystal-field split Stark levels of the $Tm^{3+}$ ions coupled with significant phonon broadening in the crystalline lattice.

Figure 4:
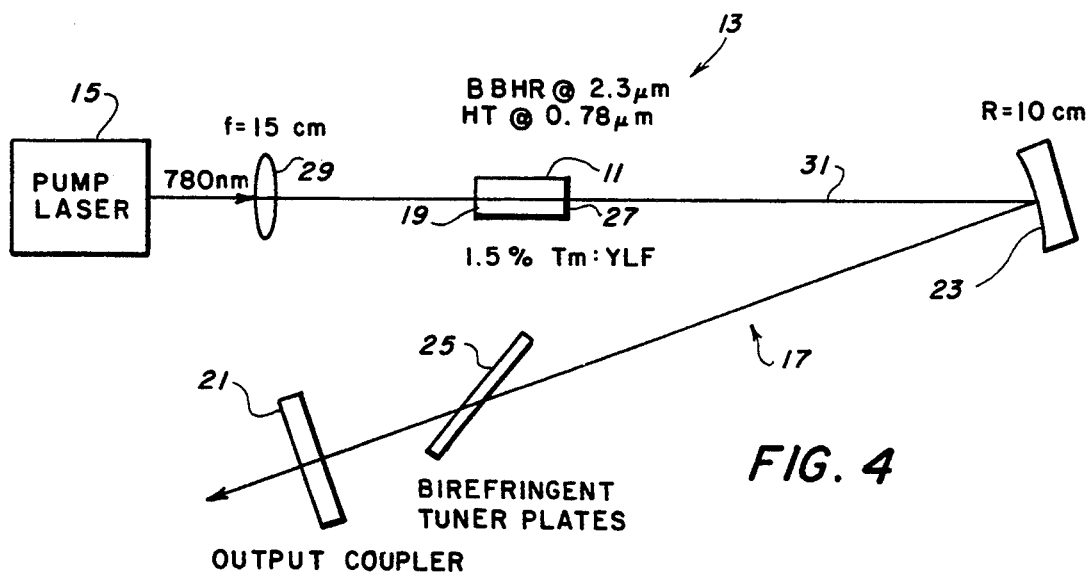
FIG. 4 illustrates a schematic block diagram of a preferred embodiment of the invention.

Referring now to FIG. 4, a preferred embodiment of the invention is illustrated The 2.3 micron $Tm^{3+}$:YLF laser performance measurements of FIG. 5 (to be discussed) were obtained by using the folded resonator geometry shown in FIG. 4, which will now be discussed.

As shown in FIG. 4, a thulium-doped ($Tm^{3+}$-doped) laser rod or crystal 11 in a room temperature solid state laser 13 is pumped by a 780 nanometer (nm) continuous wave (CW) laser beam from a pump laser 15 to produce a CW laser emission which is tunable in the 2.3 micron wavelength region over the spectral range from about 2.20 microns to about 2.46 microns. The laser rod or crystal 11 is disposed in a laser cavity or resonator 17 defined by a first reflective element 19, an output coupler or reflective element 21 and a folded or folding mirror 23 disposed between the first reflective element 19 and the output coupler 21. A tuning element 25, such as a birefringent filter or tuner, a prism, or a grating, is disposed in the optical path between the folded mirror 23 and the output coupler 21.

Pump laser 15, which emits the 780 nm laser beam to pump the laser crystal 11, is preferably a gallium-aluminum-arsenide (GaAlAs) laser diode array or a GaAlAs laser diode. However, the pump laser 15 can also be a titanium-sapphire laser which can also produce a CW pump beam at a wavelength of 780 nm. The pump wavelength of 780 nm (shown in FIGS. 1 and 4) was chosen because 780 nm is the absorption peak of the thulium in the solid state laser 13, as shown in FIG. 2.

It should be noted at this time that the pump laser 15 could more preferably be an InGaAsP laser diode array or an InGaAsP laser diode, which can emit a 685 nm laser beam to pump the laser crystal 11. This is particularly true since, as discussed before and shown in FIG. 2, the absorption coefficient at a pump wavelength of about 685 nm is about three times stronger than the absorption coefficient at a pump wavelength of about 780 nm.

The end face of the laser rod 11 nearer to the pump laser 15 could operate as the first reflective element 19. In such a case, the end face 19 would be dielectrically coated for high reflection (HR) at 2.3 microns and high transmission at 780 nm in order to serve as a high reflector for the laser cavity or resonator 17. However, it should be understood that the first reflective element could be a separate mirror spaced apart from the laser crystal or rod 11. The other end face 27 of the laser rod 11 is anti-reflection coated at 2.3 microns to minimize intracavity losses.

The laser crystal or rod 11 has a laser host crystal material (not shown) into which the $Tm^{3+}$ ions are doped with a preselected concentration (to be discussed). Before the laser host crystal material of the laser crystal 11 and the concentration of the $Tm^{3+}$ dopant in that host material are discussed, it should be recalled that it had been stated before that previous laser operation of the 2.3 micron laser has been either at a single wavelength or at several wavelengths that were not continuously tunable; that a major reason for this is that laser performance of the $Tm^{3+}$, $^3H_5$, 2.3 micron transition is affected by multiphonon decay and $Tm^{3+}$ion-pair cross-relaxation; and that each of these mechanisms nonradiatively depletes the $^3H_4$ laser level, resulting in reduced fluorescence lifetimes and correspondingly high CW lasing thresholds.

In relation to the above-mentioned previous discussion, it should be noted that applicants have discovered in their lab experiments and work that fluoride hosts, such as YLF, have lower multiphonon relaxation rates, resulting in longer upper state lifetimes as compared to oxides. For example, the fluorescence lifetime of the $^3H_4$ manifold for a 1.5% $Tm^{3+}$ ion concentration is approximately 930 microseconds in YLF compared with 340 microseconds in YAG. In addition, nonradiative energy transfer via ion-pair cross-relaxation ($^3H_4 + ^3H_6 \rightarrow ^3F_4 + ^3F_4$) is highly concentration dependent. For a $Tm^{3+}$ ion concentration above 2 at. %, the $^3H_4$ manifold fluorescence lifetime is significantly quenched. Hence for low threshold CW laser operation of the 2.3 micron $^3H_4$–$^3H_5$ transition, $Tm^{3+}$ concentration levels should be kept below 2 at. %. This is in contrast to the high $Tm^{3+}$ concentrations required for efficient 2 micron laser operation (based on the $^3F_4$–$^3F_6$ transition) where quenching of the $^3H_4$ level significantly improves 2 micron laser performance.

Experiments have shown that the $Tm^{3+}$ ion concentration in the host material of the laser rod or crystal 11 should be broadly between about 1% and 2%, preferably between about 1.3% and about 1.7%, and most preferably about 1.5%.

The laser host material of the laser crystal or rod 15 is selected from the broad group consisting of YLF (yttrium lanthanum fluoride), GSGG (gadolinium scandium gallium garnet), YSAG (yttrium scandium aluminum garnet), GSAG (gadolinium scandium aluminum garnet), GGG (gadolinium gallium garnet), YGG (yttrium gallium garnet), LLGG (lanthanum lutetium gallium garnet), YAG (yttrium aluminum garnet), VYOhd 4 1 (vanadium yttrium oxide), YA10 (yttrium aluminum oxygen) and YSGG (yttrium scandium gallium garnet). The laser host material could also be comprised of mixtures or combinations of this broad group of crystal materials The preferred group of host crystal materials is comprised of YLF, GSGG, YAG, YSAG, YSGG, GSAG and mixtures thereof; and the most preferred group of laser host materials is comprised of YLF, GSGG and mixtures thereof.

The selected host material of the laser crystal or rod 11 is doped with an effective amount of $Tm^{3+}$ (thulium) activator ions. When the laser rod 11 is pumped by the CW laser beam from the pump laser 15, the laser crystal 11 develops an output CW laser emission (to be explained).

The chief characteristic or requirement of a selected host crystal material is that it must have the capability of easily accepting the dopant trivalent thulium ions ($Tm^{3+}$). The dopant $Tm^{3+}$ ions must go into the host crystal material without significantly distorting the lattice of the host crystal material so that the quality of the host crystal material remains high.

The $Tm^{3+}$ ions are the activator ions which cause the lasing from the laser crystal 15. The $Tm^{3+}$ concentration must be low enough ($\leq 2\%$) so as to avoid the efficient cross-relaxation process (to be explained), which would populate the upper laser level.

The crystal host material can be selected from the above-listed broad group of crystals (YLF, GSGG, YSAG, GSAG, GGG, LLGG, YAG, VYOhd 4 1 and YALO) and be doped with an amount of $Tm^{3+}$ ions between about 1.0% and about 2.0%. The crystal host material is preferably selected from the preferred group of YLF, GSGG, YAG, YSAG, YSGG, and GSAG and crystals and is doped with a preferred amount of $Tm^{3+}$ ions between about 1.3% and about 1.7%. The crystal host material is most preferably selected from the group of YYLF and GSGG crystals and is doped with a most preferred amount of $Tm^{3+}$ ions of about 1.5%.

As stated before, the $Tm^{3+}$:YLF rod was oriented with its c-axis parallel to the polarization of the pump laser 15 for maximum absorption With a $Tm^{3+}$ ion concentration of 1.5 at. %., a 1 cm (centimeter) long laser rod 11 was utilized, absorbing 80% of the incident pump light from pump laser 15, while avoiding excessive quenching by way of cross relaxation.

In the operation of the laser system of FIG. 4, the 780 nm CW pump beam from the pump laser 15 is focused into the laser crystal 11 in the laser cavity 17 by a lens 29 having a 15 cm focal length. Following the absorption of the 780 nm pump beam directly into the $^3H_4$ manifold of the laser crystal 11, laser emission at 2.3 microns takes place from the $^3H_4$ manifold or upper laser level to the $^3H_5$ manifold or lower laser level of the laser crystal 11. The 2.3 micron emission passes through the almost 100% transmissive end face 27 of the laser crystal 11 and along an optical path 31 to the folded mirror 23. The folding mirror 23 collimates the CW emission that it reflects to the output coupler 21. For best operation the tuning element 25, which is preferrably a birefringent filter or birefringent tuning element, is disposed in the collimated light between the folding mirror 23 and the output coupler 21 to tune the CW laser emission in the 2.3 micron wavelength region over the spectral or wavelength range from about 2.20 microns to about 2.46 microns.

The birefringent filter or birefringent tuning element 25, which can be an exemplary birefringent quartz plate or birefringent filter plate, is inserted in the cavity 17 and oriented at Brewster's angle, between the folding mirror 23 and the output coupler 21. Continuous tuning of the solid laser 13 over the desired wavelength range of from about 2.20 microns to about 2.46 microns can be achieved by using a motor (not shown) or other rotatable device (not shown), which is operationally coupled to the tuning element 25, to slowly rotate the tuning element 25 about its axis in either direction. As indicated before, the tuning element 25 can also be a prism, a grating or any other suitable device for tuning the collimated laser emission between the folding mirror 23 and the output coupler 21 to any desired wavelength in the wavelength range between 2.20 microns and 2.46 microns.

The output coupler 21 can have a transmissivity (T) of, for example, 0.5% to pass a small portion of the laser emission out of the cavity 17 as the laser output at the desired wavelength. The rest of the laser emission in the cavity 17 is reflected back to the folded mirror 23. The folded mirror 23 has a 10 cm radius of curvature to establish a tight beam waist of 60 microns in the laser crystal 11 for light reflected from the folding mirror 23 back to the laser crystal 11.

Figure 5:
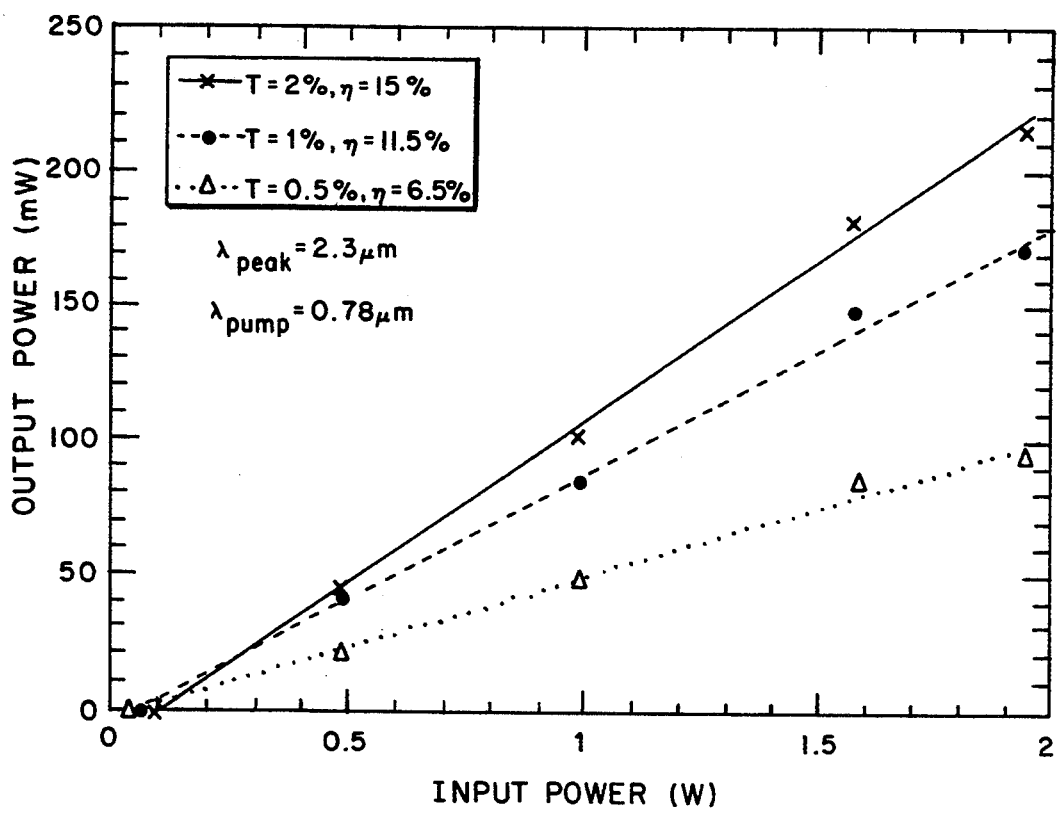
FIG. 5 illustrates the 2.3 micron $Tm^{3+}$:YLF laser performance data for various output coupler transmission values.

FIG. 5 shows the laser performance of the 2.3 micron $Tm^{3+}$:YLF laser of FIG. 4 for various exemplary output coupler values. For example, an output power of 200 mW was obtained for 1.9 Watts of incident pump power using a 2% T output coupler 21. A slope efficiency ($\eta$) of 15% was measured relative to absorbed pump power. Low threshold (40 mW of incident pump power) operation of the Tm:YLF laser was achieved using a 0.5% T output coupler. Using Findley-Clay analysis, in which lasing threshold is measured as a function of output coupler transmission values, a round trip cavity loss of about 1% was extrapolated for this resonator.

Furthermore, in relation to FIG. 5, free-running laser operation was observed to be $\pi$-polarized, which is consistent with the strongly polarized emission data shown in FIG. 3.

Figure 6:
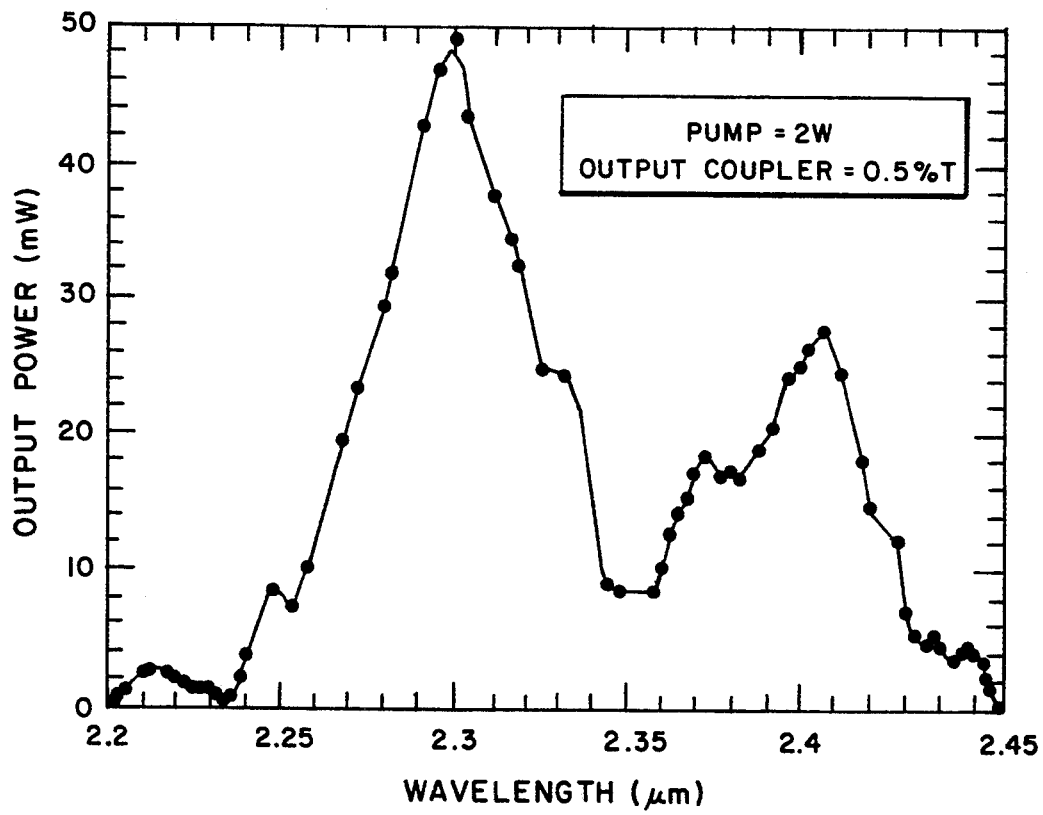
FIG. 6 illustrates power tuning data for the $Tm^{3+}$:YLF laser over the tunable wavelength range from 2.20 microns to 2.46 microns.

FIG. 6 shows the power tuning curve of the $Tm^{3+}$:YLF laser of FIG. 4 when pumped with an input power of 2 Watts. Continuous tunability from 2.20 microns to 2.46 microns was obtained using a 0.5% T output coupler. The tuning data shown in FIG. 6 closely matches the $^3H_4$–$^3H_5$ fluorescence spectrum shown in FIG. 3.

Further improvement in 2.3 micron $Tm^{3+}$:YLF laser operation may be obtained by pumping into the $Tm^{3+}$ $^3F_3$ manifold at 685 nm (as discussed in relation to FIG. 1), followed by nonradiative decay into the $^3H_4$ upper laser level. Although the quantum defect is slightly lower at this pump wavelength, the absorption coefficient at 685 nm is 3 times larger than at 780 nm. Experimentally, pumping the $Tm^{3+}$:YLF laser resonator described above at 685 nm resulted in improved CW laser performance at 2.3 microns. Using a 2% transmission output coupler 21, similar slope efficiencies as with 780 nm pumping were obtained, with a 33% reduction in pump power threshold due to the increased absorption coefficient. An additional benefit of pumping at 685 nm is that lower $Tm^{3+}$ ion doping levels can be utilized, thereby reducing the self-quenching nonradiative energy transfer losses from the upper laser level, while still maintaining good mode-matching conditions.

In conclusion, continuously tunable CW laser operation of a $Tm^{3+}$:YLF laser in the 2.3 micron wavelength region extending from 2.20 microns to 2.46 microns has been produced. Output powers of 200 mW with slope efficiencies of 15% were produced by this $Tm^{3+}$:YLF laser when pumped with 2W at 780 nm. Low threshold laser operation was also obtained utilizing a 685 nm pump source. With the commercial availability of laser diodes operating at 685 nm, the potential for a practical diode-pumped device exists.

Therefore, what has been described in a preferred embodiment of the invention is a a room-temperature, solid state, diode-pumped, continuously-tunable, 2.3 micron CW laser for producing an output laser emission at any wavelength within a preselected range of wavelengths from about 2.20 microns to about 2.46 microns. In a preferred embodiment, the laser 13 comprises: a diode pump laser 15 for emitting a CW pump beam at a preselected wavelength; a laser cavity 17 defined by a first reflective element 19, an output coupler reflective element 21 and a folded mirror 23 disposed between the first reflective element 19 and the output coupler reflective element 21 to form a reflective path thereamong in the laser cavity 17. A laser crystal 11 is disposed in the laser cavity 17. The laser crystal 11 is responsive to the CW pump beam at the preselected wavelength for producing a CW laser emission within a preselected range of wavelengths when the laser crystal 11 is pumped by the CW pump beam at the preselected wavelength. The folded mirror 23 operates to collimate the CW laser emission in the optical path between the folded mirror 23 and the output coupler reflective element 21. A tuning element 25 is disposed in the laser cavity 17 between the folded mirror 23 and the output coupler reflective element 21 for tuning the collimated CW laser emission to any wavelength within the preselected range of wavelengths between 2.20 microns and 2.46 microns.

It should therefore readily be understood that many modifications and variations of the present invention are possible within the purview of the claimed invention. It is therefore to be understood that, within the scope of the appended claims, the invention may be practiced otherwise than as specifically described.

What is claimed and desired to be secured by Letters Patent of the United States is:

1. A room-temperature solid state laser comprising:
    means for emitting a CW pump beam at a preselected wavelength;
    a laser cavity defined by a first reflective element, an output coupler reflective element and a folded mirror disposed between said first reflective element and said output coupler reflective element to form a reflective path thereamong in said laser cavity;
    a laser crystal disposed in said laser cavity, said laser crystal having a host material doped with a concentration of $Tm^{3+}$ activator ions sufficient to produce a laser emission on the $^3H_4$ to $^3H_5$ transition of the $Tm^{3+}$ activator ions when the laser crystal is pumped by the CW pump beam at the preselected wavelength, said laser crystal being responsive to the CW pump beam at the preselected wavelength for producing a CW laser emission within a preselected range of wavelengths between about 2.20 microns and about 2.46 microns when said laser crystal is pumped by the CW pump beam at the preselected wavelength, said laser crystal having a first end face coated to be transmissive to the preselected wavelength of the CW pump beam and highly reflective at the wavelength of the CW laser emission produced by said laser crystal, and a second end face anti-reflection coated at the wavelength of the cW laser emission produced by said laser crystal, said folded mirror collimating the CW laser emission in the optical path between said folded mirror and said output coupler reflective element; and
    means disposed in said laser cavity between said folded mirror reflective element and said output coupler reflective element for tuning the collimated Cw laser emission to any wavelength within the preselected range of wavelength between about 2.20 microns and about 2.46 microns.

2. The laser of claim 1 wherein said laser crystal includes:
    a host material doped with activator ions to produce the CW laser emission within the preselected range of wavelengths when said laser crystal is end-pumped by the CW pump beam at the preselected wavelength.

3. The laser of claim 1 wherein said laser crystal includes:
    a host material doped with an amount of thulium activator ions sufficient to produce a CW laser emission within a preselected range of wavelengths between about 2.20 microns and about 2.46 microns when said laser crystal is pumped by said CW pump beam at the preselected wavelength.

4. The laser of claim 3 wherein;
    said host material is selected from the group consisting of consisting of YLF, GSGG, YSAG, GSAG, GGG, YGG, LLGG, YAG, $VYO_4$, YAlO, YSGG and mixtures thereof; and
    said host material is doped with an amount of $Tm^{3+}$ activator ions between about 1% and about 2%.

5. The laser of claim 3 wherein:
    said host material is selected from the group consisting of YLF, GSGG, YAG, YSAG, YSGG, GSAG and mixtures thereof; and
    said host material is doped with an amount of $Tm^{3+}$ activator ions between about 1.3% and about 1.7%.

6. The laser of claim 3 wherein:
    said host material is selected from the group consisting of YLF, GSGG and mixtures thereof; and
    said host material is doped with an amount of $Tm^{3+}$ activator ions of substantially 1.5%.

7. The laser of claim 3 wherein:
    said host material is YLF; and
    said host material is doped with an amount of $Tm^{3+}$ ions of substantially 1.5%.

8. The laser of claim 1 wherein said tuning means includes:
    a tuning element; and
    means for rotating said tuning element about its axis to tune the CW laser emission to any wavelength within the preselected range of wavelengths.

9. The laser of claim 8 wherein:
    said tuning element is selected from the group consisting of a birefringent plate having substantially flat and substantially parallel first and second surfaces, a prism and a grating.

10. The laser of claim 8 wherein:

said tuning element is a birefringent plate having substantially flat and substantially parallel first and second surfaces.

11. The laser of claim 10 wherein:

said birefringent plate is a quartz birefringent filter plate disposed in said laser cavity at the Brewster angle substantially between the normal to said first surface of said quartz birefringent filter plate and the path of said CW laser emission from said laser crystal.

12. The laser of claim 1 wherein:

said emitting means is comprised of a titanium-sapphire laser for emitting the CW pump beam at a wavelength of approximately 0.78 microns.

13. The laser of claim 1 wherein:

said emitting means is comprised of a laser diode source for emitting the CW pump beam at a wavelength of approximately 0.78 microns.

14. The laser of claim 13 wherein said tuning means includes:

a tuning element; and means for rotating said tuning element about its axis to tune the CW laser emission to any wavelength within said plurality of wavelengths.

15. The laser of claim 1 wherein:

said first reflective element comprises a dichroic coating on the input surface of said laser crystal, said dichroic coating having a high transmissivity at the pump wavelength of said emitting means and a high reflectivity at approximately 2.3 microns; and said output coupler reflective element having a low transmissivity at approximately 2.3 microns to pass CW laser emissions within said range between about 2.20 microns and about 2.46 microns.

16. The laser of claim 15 wherein said tuning means includes:

a tuning element; and means for rotating said tuning element about its axis to tune the CW laser emission to any wavelength within the preselected range of wavelengths.

17. The laser of claim 16 wherein:

said emitting means is selected from the group consisting of a titanium-sapphire laser to emit the CW pump beam at a wavelength of about 0.78 microns, a laser diode source to emit the CW pump beam at a wavelength of about 0.78 microns and a laser diode source to emit the CW pump beam at a wavelength of about 0.685 microns.

18. The laser of claim 16 wherein:

said emitting means is selected from the group consisting of an AlGaAs diode to emit the CW pump beam at a wavelength of about 0.78 microns, an InGaAsP diode to emit the CW pump beam at a wavelength of about 0.685 microns and a titanium-sapphire laser to emit the CW pump beam at a wavelength of about 0.78 microns.

19. The laser of claim 1 further including:

optical means disposed between said emitting means and said laser crystal for matching the CW pump beam to said laser crystal.

20. A method for producing a CW laser emission at any of a plurality of wavelengths within the range between about 2.20 microns and about 2.46 microns, said method comprising the steps of:

forming a laser crystal having a host material doped with a concentration of $Tm^{3+}$ activator ions sufficient to produce a laser emission on the $^3H_4$ to $^3H_5$ transition of the $Tm^{3+}$ activator ions when the laser crystal is pumped by a CW pump beam at a preselected wavelength;

generating a CW pump beam at the preselected wavelength;

directing the CW pump beam into $Tm^{3+}$-doped host material of the laser crystal to produce a CW laser emission in the approximate 2.20 to 2.46 micron range of the $^3H_4$ to $^3H_5$ transition of the $Tm^{3+}$ activator ions; and tuning the CW laser emission to a wavelength within the range between about 2.20 microns and about 2.46 microns.

* * * * *